United States Patent

[11] 3,624,155

[72] Inventors Andrew Harper Dinwoodie
  Dalry;
  James Grigor, Coatbridge, both of Scotland
[21] Appl. No. 240,772
[22] Filed Nov. 27, 1962
[45] Patented Nov. 30, 1971
[73] Assignee The United States of America as represented by the Secretary of the Navy
[32] Priority Nov. 30, 1961
[33] Great Britain
[31] 42,971/61

[54] DIFLUOROAMINO SUBSTITUTED CYCLOHEXANE
  2 Claims, No Drawings
[52] U.S. Cl.......................................................... 260/563 R,
  149/109, 260/583 NH, 260/584 R
[51] Int. Cl.......................................................... C07c 85/08
[50] Field of Search............................................ 260/583,
  584 R, 563 C, 563 R, 583 NH

*Primary Examiner*—Leland A. Sebastian
*Attorneys*—R. S. Sciascia and A. L. Branning CLAIM: 1. A process for the preparation of the bis(difluoramino) compounds which comprises reacting consisting of a ketone selected from the group consisting of acetone, cyclohexanone and cyclohexan-1,4-dione with difluoramine alone to give the hydroxy (difluoramino) derivative of the ketone, and then of reacting said derivative with difluoramine in the presence of an acid selected from the group consisting of fluorosulphonic acid and chlorosulphonic acid to give the bis(difluoramino) compounds.

DIFLUOROAMINO SUBSTITUTED CYCLOHEXANE

The present invention relates to the preparation of bis(difluoramino) derivatives of ketones.

Such derivatives find utility as propellent explosive ingredients. It has been proposed to prepare such compounds by refluxing a ketone with difluoramine in the presence of sulfuric acid. Our copending U.S. Pat. application No. 235,885 now Pat. No. 3,432,554 describes processes in which boron trifluoride is substituted for the sulfuric acid in order to facilitate the purification of the reaction products.

According to the present invention, the bis(difluoramino) derivative of acetone, cyclohexanone or cyclohexane-1,4-dione is prepared by refluxing the ketone with difluoramine in the presence of fluorosulfonic acid or chlorosulfonic acid.

The reaction may be carried out with the mere reaction media or may alternatively be carried out in solution or dispersion in inert liquids.

It may be preferred to carry out the reaction in two stages by first reacting the ketone with difluoramine alone to give the hydroxy(difluoramino) derivative of the ketone which is then reacted with difluoramine together with the fluorosulfonic or chlorosulfonic acid.

The nature of the present invention will be more fully understood if reference is made to the following examples:

EXAMPLE 1

Four m. moles cyclohexane-1,4-dione was dissolved in 3 cc. fluorosulfonic acid at room temperature and approximately 5 g. liquid difluoramine, produced by condensation of gaseous difluoramine on a 'cold finger' condenser at −80° C. was allowed to drop on to the solution and reflux for 4 hours. Excess difluoramine was then removed by purging with a slow stream of nitrogen. The reaction mixture was poured into 10 cc. ice water and the resulting precipitate dissolved in ethanol and filtered. The filtrate was treated with water and 1.4 m. moles 1,1,4,4-tetrakis(difluoramino) cyclohexame

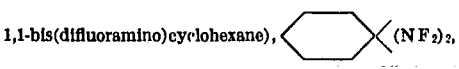

crystallized out, and was found to have the following properties:

Analysis—found    C, 24.8%,   H, 2.8%,   N, 19.8%,   F, 52.8%
    calculated for $C_6H_8N_4F_8$
                  C, 25.0%,   H, 2.8%,   N, 19.5%,   F, 52.8%

Melting point 107°–108° C. Density 1.7 g./cc.
Impact Sensitivity 1 Kg. Mild Steel hammer/Mild steel 10–20 cm.

Thermally stable to 220° C. but burns very rapidly with a fierce flame when ignited.

Soluble in diethyl ether, ethyl alcohol, dichloromethane, nitroglycerine.

EXAMPLE 2

Seventy m. moles acetone was dissolved in 10 cc. dichloromethane and was stirred whilst approximately 5 g. liquid difluoramine, again produced by condensation of gaseous difluoramine on a 'cold finger' condenser at −80° C., was refluxed on to the solution. When the reflux action had been established for about 10 minutes, 71 m. moles of fluorosulfonic acid was slowly added dropwise, and the reflux then continued for a further 4 hours. Excess difluoramine was again removed at the end of the reaction time by purging with nitrogen. The reaction mixture was poured on to 10 g. ice and shaken vigorously in a separating funnel. A lower layer amounting to 15 cc. was removed and dried over anhydrous sodium sulfate. Evaporation of the dichloromethane reduced the volume to 4.5 cc. which was found to be 30 m. moles 2,2-bis(difluoramino) propane, $CH_3 \cdot C(NF_2)_2 - CH_3$. This was found to have the following properties:

Analysis—found    C, 24.0%,   H, 4.5%,   N, 19.3%,   F, 51.5%
    calculated for $C_3H_6N_2F_4$
                  C, 24.6%,   H, 4.1%,   N, 19.2%,   F, 52.0%

A liquid boiling at 71° C. at 760 mm. pressure and soluble in diethyl ether, ethyl alcohol, dichloromethane.

Thermally stable to 220° C., but burns rapidly and fiercely on ignition.

EXAMPLE 3

Sixteen moles of cyclohexanone was dissolved in 5 cc. dichloromethane and treated with approximately 5 g. difluoramine and 17 m. moles of fluorosulfonic acid in the manner described in example 2. Following removal of the dichloromethane 7 m. moles

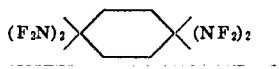

were produced.

This showed the following properties:

Analysis—found    C, 38.5%,   H, 5.9%,   N, 15.2%,   F, 40.7%
    calculated for $C_6H_{10}N_2F_4$
                  C, 38.7%,   H, 5.4%,   N, 15.1%,   F, 40.9%

A liquid boiling at 165° C. at 760 mm. pressure and soluble in diethyl ether, ethyl alcohol, dichloromethane.

Thermally stable to 220° C. but ignites to burn rapidly with a fierce flame.

EXAMPLE 4

Two m. moles 1,4-dihydroxy-1,4-bis(difluoramino) cyclohexane was dissolved in 3 cc. fluorosulfonic acid and treated with difluoramine as in example 1. The product was 1.1 m. moles 1,1,4,4-tetrakis(difluoramino) cyclohexane, having the properties outlined in example 1.

EXAMPLE 5

Four m. moles cyclohexane-1,4-dione was dissolved in 10 cc. dichloromethane and approximately 5 g. liquid difluoramine, produced by condensation of gaseous difluoramine on a 'cold finger' condenser at −80° C., was allowed to reflux on to the solution. When the reflux action had been established for about ten minutes, 1 cc. chlorosulfonic acid was slowly added dropwise, and the reflux continued for a further 4 hours. Excess difluoramine was then removed by purging with a slow stream of nitrogen. The black oily reaction mixture was poured into 10 cc. ice water, extracted with dichloromethane, and the extract dried and evaporated to give a pale brown solid. This solid was shown by its infrared spectrum, sublimation and analysis to contain 0.7 m. moles, 1,1,4,4-tetrakis(difluoramino) cyclohexane, again having the general properties described in example 1.

EXAMPLE 6

Twenty-five m. moles cyclohexanone was dissolved in 10 cc. dichloromethane and treated with approximately 5 g. difluoramine and 2 cc. chlorosulfonic acid in the manner described in example 1b. Following removal of the dichloromethane, 15 m. moles 1,1-bis(difluoramino) cyclohexane were isolated, and this had the general properties described in example 3.

What we claim is:

1. A process for the preparation of the bis(difluoramino) compounds which comprises reacting a ketone selected from the group consisting of acetone, cyclohexanone and cyclohexan-1,4-dione with difluoramine alone to give the hydroxy (difluoramino) derivative of the ketone, and then of reacting said derivative with difluoramine in the presence of an acid selected from the group consisting of fluorosulfonic acid and chlorosulfonic acid to give the bis(difluoramino) compounds.

2. A process according to claim 1, wherein the reaction is carried out in an inert liquid.